United States Patent
Smith

(10) Patent No.: US 10,055,048 B2
(45) Date of Patent: Aug. 21, 2018

(54) NOISE ADAPTIVE FORCE TOUCH

(71) Applicant: Apple Inc., Cupertino, CA (US)

(72) Inventor: John Stephen Smith, Cupertino, CA (US)

(73) Assignee: Apple Inc., Cupertino, CA (US)

(*) Notice: Subject to any disclaimer, the term of this patent is extended or adjusted under 35 U.S.C. 154(b) by 98 days.

(21) Appl. No.: 14/815,670

(22) Filed: Jul. 31, 2015

(65) Prior Publication Data

US 2017/0031495 A1    Feb. 2, 2017

(51) Int. Cl.
*G06F 3/041* (2006.01)
*G06F 3/044* (2006.01)
*G06F 3/01* (2006.01)

(52) U.S. Cl.
CPC .......... *G06F 3/0416* (2013.01); *G06F 3/016* (2013.01); *G06F 3/0414* (2013.01); *G06F 3/0418* (2013.01)

(58) Field of Classification Search
CPC .. G06F 3/04883; G06F 3/0416; G06F 3/0412; G06F 3/0414; G06F 3/04847; G06F 3/0482; G06F 2203/014; G06F 2203/04106; G06F 2203/04105; G06F 2203/04808
See application file for complete search history.

(56) References Cited

U.S. PATENT DOCUMENTS

| | | | |
|---|---|---|---|
| 3,876,912 A | 4/1975 | Sanders | |
| 4,345,477 A | 8/1982 | Johnson | |
| 4,423,640 A | 1/1984 | Jetter | |
| 4,516,112 A | 5/1985 | Chen | |
| 4,634,917 A | 1/1987 | Dvorsky et al. | |
| 4,695,963 A | 9/1987 | Sagisawa | |
| 4,951,510 A | 8/1990 | Holm-Kennedy et al. | |
| 5,481,905 A | 1/1996 | Pratt | |
| 5,577,021 A | 11/1996 | Nakatani et al. | |
| 5,673,041 A | 9/1997 | Chatigny et al. | |
| 5,708,460 A | 1/1998 | Young | |
| 5,790,215 A | 8/1998 | Sugahara | |
| 5,915,285 A | 6/1999 | Sommer | |
| 6,288,829 B1 | 9/2001 | Kimura | |
| 6,369,865 B2 | 4/2002 | Hinata | |
| 6,812,161 B2 | 11/2004 | Heremans | |

(Continued)

FOREIGN PATENT DOCUMENTS

| CN | 1527933 A | 9/2004 |
|---|---|---|
| CN | 1796955 | 7/2006 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Md Saiful A Siddiqui
(74) *Attorney, Agent, or Firm* — Brownstein Hyatt Farber Schreck, LLP

(57) ABSTRACT

Disclosed herein is an electronic device having a force sensing device. The force sensing device receives a continuous force input which is translated into a discrete event. In order to more accurately determine the type of discrete event intended by a user, the electronic device is able to determine an amount of noise present in the electronic device and dynamically adjust force threshold values associated with the force sensing device.

22 Claims, 7 Drawing Sheets

(56) References Cited

U.S. PATENT DOCUMENTS

| | | |
|---|---|---|
| 7,154,481 B2 | 12/2006 | Cross et al. |
| 7,176,897 B2 | 2/2007 | Roberts |
| 7,190,350 B2 | 3/2007 | Roberts |
| 7,196,694 B2 | 3/2007 | Roberts |
| 7,211,885 B2 | 5/2007 | Nordal et al. |
| 7,392,716 B2 | 7/2008 | Wilner |
| 7,441,467 B2 | 10/2008 | Bloom |
| 7,511,702 B2 | 3/2009 | Hotelling |
| 7,724,248 B2 | 5/2010 | Saito |
| 7,755,616 B2 | 7/2010 | Jung et al. |
| 7,800,592 B2 | 9/2010 | Kerr et al. |
| 8,020,456 B2 | 9/2011 | Liu et al. |
| 8,077,154 B2 | 12/2011 | Emig et al. |
| 8,132,468 B2 | 3/2012 | Radivojevic |
| 8,243,225 B2 | 8/2012 | Kai et al. |
| 8,266,971 B1 | 9/2012 | Jones |
| 8,305,358 B2 | 11/2012 | Klighhult et al. |
| 8,421,483 B2 | 4/2013 | Klinghult et al. |
| 8,434,369 B2 | 5/2013 | Hou et al. |
| 8,456,430 B2 | 6/2013 | Oliver et al. |
| 8,519,974 B2 | 8/2013 | Berggren |
| 8,605,053 B2 | 12/2013 | Murphy et al. |
| 8,669,952 B2 | 3/2014 | Hashimura et al. |
| 8,692,646 B2 | 4/2014 | Lee et al. |
| 8,711,128 B2 | 4/2014 | Small et al. |
| 8,780,060 B2 | 7/2014 | Maschmeyer et al. |
| 8,780,074 B2 | 7/2014 | Castillo et al. |
| 8,780,543 B2 | 7/2014 | Molne et al. |
| 8,878,803 B2 | 11/2014 | Kimura et al. |
| 9,024,910 B2 | 5/2015 | Stephanou et al. |
| 9,030,427 B2 | 5/2015 | Yasumatsu |
| 9,063,599 B2 | 6/2015 | Yanagi et al. |
| 9,081,460 B2 | 7/2015 | Jeong et al. |
| 9,099,971 B2 | 8/2015 | Lynn et al. |
| 9,110,532 B2 | 8/2015 | Ando et al. |
| 9,116,570 B2 | 8/2015 | Lee et al. |
| 9,182,849 B2 | 11/2015 | Huang et al. |
| 9,182,859 B2 | 11/2015 | Coulson et al. |
| 9,223,162 B2 | 12/2015 | DeForest et al. |
| 9,304,348 B2 | 4/2016 | Jang |
| 9,383,848 B2 | 7/2016 | Daghigh |
| 9,417,696 B2 | 8/2016 | DeLuca |
| 9,417,725 B1 | 8/2016 | Watazu et al. |
| 9,454,268 B2 | 9/2016 | Badaye et al. |
| 9,466,783 B2 | 10/2016 | Olien et al. |
| 9,507,456 B2 | 11/2016 | Watazu et al. |
| 9,542,028 B2 | 1/2017 | Filiz et al. |
| 9,612,170 B2 | 4/2017 | Vosgueritchian et al. |
| 9,658,722 B2 | 5/2017 | Schwartz |
| 9,665,200 B2 | 5/2017 | Filiz et al. |
| 9,690,414 B2 | 6/2017 | Kano et al. |
| 9,874,965 B2 | 1/2018 | Pedder et al. |
| 9,886,118 B2 | 2/2018 | Vosgueritchian et al. |
| 2002/0149571 A1 | 10/2002 | Roberts |
| 2006/0197750 A1* | 9/2006 | Kerr .................. G06F 1/1626 345/173 |
| 2007/0032967 A1* | 2/2007 | Feen .................. H03K 17/955 702/47 |
| 2008/0165159 A1 | 7/2008 | Soss et al. |
| 2008/0218488 A1 | 9/2008 | Yang et al. |
| 2009/0002199 A1 | 1/2009 | Lainonen et al. |
| 2009/0189866 A1 | 7/2009 | Haffenden et al. |
| 2009/0316380 A1 | 12/2009 | Armstrong |
| 2010/0053116 A1 | 3/2010 | Daverman et al. |
| 2010/0103115 A1 | 4/2010 | Hainzl |
| 2010/0117809 A1 | 5/2010 | Dai et al. |
| 2010/0214258 A1* | 8/2010 | Kuan .................. G06F 3/045 345/174 |
| 2010/0225604 A1* | 9/2010 | Homma .................. G06F 3/0414 345/173 |
| 2011/0045285 A1 | 2/2011 | Saiki et al. |
| 2011/0167391 A1* | 7/2011 | Momeyer .................. G06F 1/1684 715/863 |
| 2011/0248839 A1* | 10/2011 | Kwok .................. G06F 3/016 340/407.2 |
| 2011/0261021 A1 | 10/2011 | Modarres et al. |
| 2011/0285660 A1 | 11/2011 | Prabhu et al. |
| 2012/0038577 A1 | 2/2012 | Brown et al. |
| 2012/0105358 A1* | 5/2012 | Momeyer .................. G06F 3/0414 345/174 |
| 2012/0105367 A1* | 5/2012 | Son .................. G06F 3/0414 345/174 |
| 2012/0127136 A1 | 5/2012 | Schneider et al. |
| 2012/0154299 A1 | 6/2012 | Hsu et al. |
| 2012/0139864 A1 | 7/2012 | Sleeman et al. |
| 2012/0188198 A1 | 7/2012 | Jeong et al. |
| 2012/0293491 A1 | 11/2012 | Wang et al. |
| 2013/0066474 A1* | 3/2013 | Coogan .................. F24F 11/0012 700/278 |
| 2013/0074988 A1* | 3/2013 | Chou .................. B27C 7/06 142/49 |
| 2013/0082970 A1 | 4/2013 | Frey et al. |
| 2013/0141365 A1* | 6/2013 | Lynn .................. G06F 3/041 345/173 |
| 2013/0141396 A1* | 6/2013 | Lynn .................. G06F 3/041 345/177 |
| 2013/0147739 A1 | 6/2013 | Aberg et al. |
| 2013/0154933 A1* | 6/2013 | Sheik-Nainar .......... G06F 3/03543 345/163 |
| 2013/0155059 A1 | 6/2013 | Wang et al. |
| 2013/0215056 A1 | 8/2013 | Johansson et al. |
| 2013/0328803 A1* | 12/2013 | Fukushima .......... G06F 3/0414 345/173 |
| 2013/0333922 A1 | 12/2013 | Kai et al. |
| 2014/0118635 A1 | 5/2014 | Yang |
| 2014/0174190 A1 | 6/2014 | Kulkarni et al. |
| 2014/0191973 A1 | 7/2014 | Zellers et al. |
| 2015/0002452 A1 | 1/2015 | Klinghult |
| 2015/0009168 A1* | 1/2015 | Levesque .................. H04M 19/04 345/174 |
| 2015/0101849 A1 | 4/2015 | Bockmeyer et al. |
| 2015/0116260 A1 | 4/2015 | Hoen et al. |
| 2015/0268725 A1* | 9/2015 | Levesque .................. G06F 3/016 345/156 |
| 2015/0301684 A1* | 10/2015 | Shimamura .......... G06F 3/0414 345/174 |
| 2015/0331517 A1 | 11/2015 | Filiz et al. |
| 2016/0033389 A1 | 2/2016 | Serpe |
| 2016/0034073 A1 | 2/2016 | Andoh |
| 2016/0035290 A1 | 2/2016 | Kim et al. |
| 2016/0041672 A1 | 2/2016 | Hoen et al. |
| 2016/0048266 A1 | 2/2016 | Smith et al. |
| 2016/0062517 A1 | 3/2016 | Meyer et al. |
| 2016/0117035 A1 | 4/2016 | Watazu et al. |
| 2016/0132151 A1 | 5/2016 | Watazu et al. |
| 2016/0147353 A1 | 5/2016 | Filiz et al. |
| 2016/0306481 A1 | 10/2016 | Filiz et al. |
| 2016/0357297 A1* | 12/2016 | Picciotto .................. G06F 3/0488 |
| 2017/0090655 A1 | 3/2017 | Zhang et al. |
| 2017/0191884 A1 | 7/2017 | Vosgueritchian et al. |
| 2017/0261387 A1 | 9/2017 | Vosgueritchian et al. |
| 2017/0269757 A1 | 9/2017 | Filiz et al. |
| 2017/0285864 A1 | 10/2017 | Pedder et al. |

FOREIGN PATENT DOCUMENTS

| | | |
|---|---|---|
| CN | 1860432 | 11/2006 |
| CN | 101017419 | 8/2007 |
| CN | 101071354 | 11/2007 |
| CN | 101201277 A | 6/2008 |
| CN | 101950224 | 1/2011 |
| CN | 102012772 | 4/2011 |
| CN | 102047088 | 5/2011 |
| CN | 102165400 | 8/2011 |
| CN | 102175362 A | 9/2011 |
| CN | 102460351 | 5/2012 |
| CN | 102591519 | 7/2012 |
| CN | 102822779 | 12/2012 |
| CN | 103026327 | 4/2013 |
| CN | 103069365 | 4/2013 |
| CN | 103197821 | 7/2013 |

(56) References Cited

FOREIGN PATENT DOCUMENTS

| | | |
|---|---|---|
| CN | 103336562 | 10/2013 |
| CN | 103582807 | 2/2014 |
| CN | 204461655 U | 7/2015 |
| CN | 104866134 | 8/2015 |
| CN | 204576454 U | 8/2015 |
| CN | 105444662 | 3/2016 |
| EP | 0332365 | 9/1989 |
| EP | 0467562 | 1/1992 |
| EP | 1840714 | 10/2007 |
| EP | 2120136 | 11/2009 |
| EP | 2381340 | 10/2011 |
| EP | 2629075 | 8/2013 |
| FR | 2907563 | 4/2008 |
| JP | 201039458 A | 2/2010 |
| JP | 2010197066 | 9/2010 |
| WO | WO 96/038833 | 12/1996 |
| WO | WO 02/035461 | 5/2002 |
| WO | WO 07/074800 | 7/2007 |
| WO | WO 11/156447 | 12/2011 |
| WO | WO 12/168892 | 12/2012 |
| WO | WO 13/177322 | 11/2013 |
| WO | WO 15/106183 | 7/2015 |
| WO | WO 15/158952 | 10/2015 |
| WO | WO 16/029354 | 3/2016 |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touch-screens-354860, Mar. 7, 2014, 1 page.

Rausch, "Printed piezoresistive strain sensors for monitoring of light-weight structures," SENSOR+TEST Conferences 2011—SENSOR Proceedings, pp. 216-220.

Schweizer, "Electrical characterization and investigation of the piezoresistive effect of PEDOT:PSS thin films," A Thesis Presented to the Academic Faculty in Partial Fulfillment of the Requirements for the Degree Master of Science of Electrical and Computer Engineering, Georgia Institute of Technology, Apr. 2005, 89 pages.

Takamatsu, et al., "Transparent conductive-polymer strain sensors for touch input sheets of flexible displays," *Journal of Micromechanics and Microengineering*, vol. 20, 2010, 6 pages.

Tsai, et al., "Fabrication of Graphene-based Micro Strain Gauge," NPL Management Ltd.—Internal, Oct. 15-16, 2012, 1 page.

* cited by examiner

NOISE ADAPTIVE FORCE TOUCH

FIELD

The described embodiments relate generally to a force sensing device. More specifically, the described embodiments are directed to dynamically updating force thresholds of a force sensing device based on an amount of noise present in an electronic device in which the force sensing device is located.

BACKGROUND

Many electronic and input devices include a touch-sensitive surface for receiving user input. Devices such as smart telephones, tablet computing devices, laptop computers, track pads, wearable communication and health devices, navigation devices, and kiosks can include a touch-sensitive surface. The touch-sensitive surface may detect and relay the location of one or more user touches, which may be interpreted by the electronic device as a command or a gesture.

In some electronic devices, a force sensor may also be used to detect and measure the force of a touch that is applied to a surface. In some cases, a force sensor and touch sensor may provide an enhanced user input for controlling an application or function of the electronic device as compared to using a touch sensor alone.

However, one challenge with incorporating a force sensing device into an electronic device is determining and compensating for the amount of noise that may be present in the electronic device. For example, the display of the electronic device or other components in the electronic device can introduce noise into the force signals produced by the force sensing device. The noise can cause errors in the force measurements which may affect both the input that is detected by the force sensing device and the output that is provided in response to the received input.

SUMMARY

Disclosed is a method for determining and compensating for an amount of noise present in an electronic device. More specifically, the embodiments disclosed herein are directed to compensating for noise in an electronic device having a force sensing device. In order to compensate for the noise, a first force threshold and a second force threshold are established. One or more operating conditions of the electronic device are also determined. Once the operating conditions of the electronic device have been determined, at least one of the first force threshold and the second force threshold are dynamically updated. The first force threshold and the second force threshold are updated based, at least in part, on the one or more operating conditions of the electronic device. When the dynamically updated force thresholds are crossed, such as for example, by a received continuous force input, a discrete event associated with the continuous force input is triggered.

A method for determining a type of force input received on a force sensing device of an electronic device is also disclosed. According to this method, a continuous force input is received on the force sensing device. A determination is then made as to whether the continuous force input exceeds a first force input threshold. When the continuous force input exceeds the first force input threshold, a determination is made as to when the continuous force input falls below a second force input threshold, the second force threshold being less than the first force input threshold. When the continuous force input falls below the second force threshold, an input signal indicative of a discrete input that is associated with the continuous force input is provided.

An electronic device having at least one sensor, a force sensing device, a processing unit and a memory coupled to the processing unit is also disclosed. The memory of the electronic device stores instructions which, when executed by the processing unit, causes the processing unit to determine a type of input received by the force sensing device. Accordingly, the processing unit makes a determination about a first force threshold and a second force threshold that corresponds to a type of discrete input. The processing unit, using data received from the sensor, also makes a determination as to one or more operating conditions of the electronic device. At least one of the first force threshold and the second force threshold are dynamically updated. The first force threshold and the second force threshold are updated based, at least in part, on the one or more operating conditions of the electronic device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure is directed to an electronic device having a force sensing device that determines an amount of force provided on an input surface of the electronic device. As will be explained below, the accuracy of the force sensing device may be affected by the amount of noise present in the electronic device.

The force sensing device detects an amount of continuous force that is applied to the input surface. This continuous force may then be translated into a discrete event. As used herein, a discrete event may be equivalent to a mouse click, a button press, a drag and drop operation, a double click and the like. Accordingly, the input surface of the electronic device, such as, for example, a cover glass of a display stack of the electronic device, may be used as an input mechanism instead of a button, a mouse or other such mechanical input device.

However, noise that is present in the electronic device may affect the accuracy of the force sensing device. For example, if the continuous force that is received is equivalent to a button press and release, the amount of force that is received must pass a first threshold amount of force in order to qualify as a button press event and must also pass a second threshold amount of force (typically an amount of force that is less than the first threshold amount of force) to qualify as a button release event. Any noise that is present in the electronic device may cause the force sensing device to falsely recognize a button press event and/or a button release event when one is not intended by the user.

Accordingly, the embodiments described herein are directed to determining one or more operating conditions of the electronic device and dynamically updating force thresholds based on the determined operating conditions. In such a manner, continuous force input may be more accurately translated into discrete events.

Figure 1:
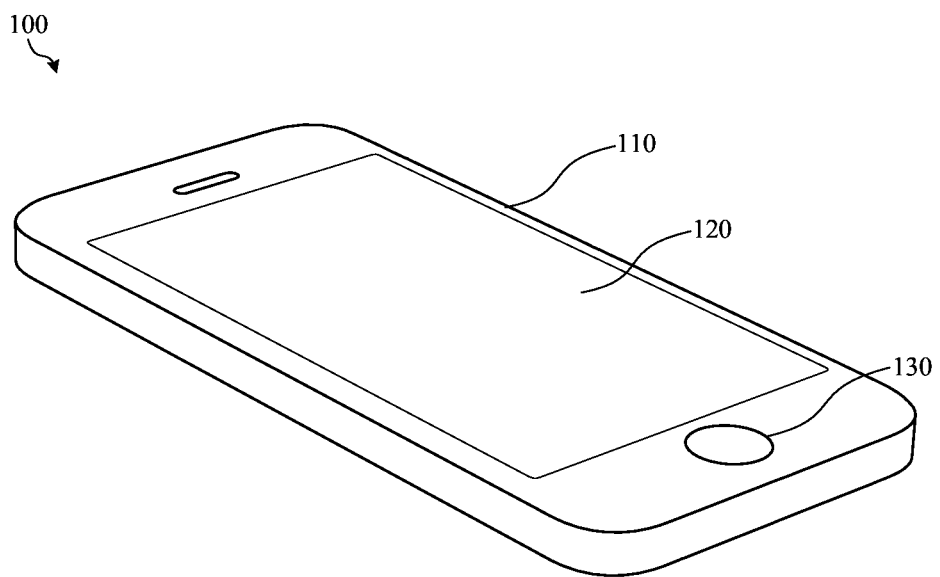
FIG. 1 shows an example electronic device that may use or incorporate a force sensing device according to one or more embodiments of the present disclosure.

FIG. 1 shows an example electronic device 100 that may include a force sensing device according to one or more embodiments of the present disclosure. The electronic device 100 may be a mobile telephone although other electronic devices are contemplated. For example, the electronic device 100 may be a tablet computer, a laptop computer, a wearable electronic device, a digital media player, a display input device, a remote control device or any such electronic device that may use force sensing device to detect received input.

The electronic device 100 includes an enclosure 110 surrounding a display 120 and one or more input/output devices (shown as a button 130). The enclosure 110 can form an outer surface or partial outer surface for the internal components of the electronic device 100. The enclosure 110 may be a housing formed of one or more components that are operably connected together. For example, the enclosure 110 may include a front piece and a back piece. Alternatively, the enclosure 110 may be formed as a single piece that is operably connected to the display 120.

The button 130 may be implemented as any type of mechanical input device. The button 130 can also be a soft button (e.g., a button or input device that does not physically move but still accepts inputs). Although a button 130 is specifically shown, various input and output devices may be used. Further, the button 130 can be integrated as part of a cover glass of the electronic device 100. Although not shown in FIG. 1, the electronic device 100 can include a microphone, a speaker, a trackpad, a camera, and one or more ports such as a network communication port and/or a power cord port and so on.

The display 120 can be implemented as any suitable display including, but not limited to, a multi-touch sensing touchscreen device that uses liquid crystal display (LCD) technology, light emitting diode (LED) technology, organic light-emitting display (OLED) technology, or organic electro luminescence (OEL) technology.

The display 120 may be used in a variety of ways. For example, the display 120 may be used to output information and may also be used as part of a touch sensing function and a force sensing function. In other words, a user can interact with an image displayed on the display 120 with one or more touches, an applied force, or both touch and force.

The touch sensing and force sensing functions can each use or share some or all of the display area. For example, a user can interact with a displayed image by touching and/or by applying a force at various locations on the display 120. In another embodiment, the touch sensing function can use the entire area of the display 120 while the force sensing function involves only a portion of the display 120. Thus, each function can use some or all of the display 120 when in operation.

The force sensing function may be provided by a force sensing device that is integrated with or otherwise associated with the display 120 or other component of the electronic device 100. Likewise, the touch sensing function may be provided by a touch sensing device that is integrated with or otherwise associated with the display 120. The touch sensing device and the force sensing device can employ any suitable sensing technology. For example, each of the touch sensing device and the force sensing device can use capacitive sensing technology, resistive sensing technology, piezoelectric or piezoresistive sensing technology, magnetic technology, optical technology, inductive technology, and ultrasonic sensing technology.

In some embodiments, the force sensing device is a strain sensor that detects a force that is applied to the electronic device 100 or to a component of the electronic device 100 such as the display 120, the button 130 or other mechanical input device. For example and as briefly described above, the force sensing device may be included or otherwise associated with an input button and/or an input region or surface of the electronic device 100. In a more specific example, the strain sensor may be implemented as a force sensitive film that produces a signal or a change in a signal in response to strain. The signal is used to determine or estimate an amount of force applied to an input region. The force sensitive film may be formed with a piezoresistive material.

The touch sensing device may be implemented as a capacitive touch sensing device that determines a location of one or more touches applied to an input region through capacitance changes in one or more capacitive sensing elements. Other embodiments can use a different type of a force sensing device and/or touch sensing device, including, but not limited to, resistive, ultrasonic, thermal, capacitive, or piezoelectric devices.

Using the various touch sensing and force sensing devices described above, a received force, such as, for example, a continuous force input, can be translated into a discrete event. For example, as force input is received, the amount of force over a given time period is monitored. Once the force input reaches a first threshold (e.g., 200 grams of force), a "button press" event is detected. When the force input reaches a second threshold that is typically less than the first threshold (e.g., 150 grams of force), a "button release" event is detected. However, if noise is present in the electronic device 100, the accuracy of the button press event and/or button release event may be compromised.

For example, if the amount of force received and/or detected by the force sensing device is approximately 120 grams of force (e.g., a user is intentionally not providing enough force to trigger a button press event), any noise that is present in the electronic device 100 may cause the force sensing device to erroneously determine that 150 grams of force or more has been provided. This causes the force sensing device to trigger a false button press event. Likewise, if a user has exerted over 150 grams of force to trigger a button press event, any noise that is present in the electronic device 100 may cause the force sensing device to erroneously determine that the received amount of force has passed below the second threshold thereby prematurely signaling a button release event. In yet another example, the amount of noise present in the electronic device 100 may cause the force sensing device to erroneously determine that an applied amount of force does not exceed the first force threshold or does not pass below the second force threshold. As such, the button press event or the button release event may be detected too late.

Although specific ranges and thresholds are given, the force sensing device described herein may sense continuous force input over a variety of ranges and across a range of sensor sensitivity. For example, the force sensing device can detect continuous ranges of force from zero to the first threshold, the second threshold and beyond and from the first threshold, the second threshold down to zero. For example, once the first threshold and/or the second threshold have been crossed, the force sensing device can still detect an increase (or decrease) in the amount of force that is received and/or applied to the electronic device.

The amount of noise that is present in the electronic device 100 may be caused by a number of factors. In one example, noise may be caused by moisture or other contaminants being present on the display 120 of the electronic device 100. In this situation, the force sensing device may be able to detect that force is being applied to the display 120 but may not be able to detect a location of the applied force, the amount of applied force and/or the location of the user's finger or other input device on the display 120.

In other situations, the temperature of the electronic device 100 may affect the amount of noise that is detected and/or present. For example, each time a user touches the display 120, the user may locally increase the temperature of the display 120 as well as the associated force sensing device. In other examples, different environments (e.g., indoors or outdoors) may subject the electronic device 100 to different ambient temperatures. In still further examples, an increase in temperature may occur as a result of heat produced by components within of the electron device 100.

More specifically, as the electronic device 100 heats or cools, the components of the force sensing device may expand or contract accordingly. Thus, these components may be more or less responsive to force that is provided or otherwise received on the display 120, the button 130 or other such input surface of the electronic device 100. Further, if a user is accessing or using the device in a cold temperature, the user may not realize the amount of force he or she is exerting on the display 120 as the user's finger may be cold or otherwise less sensitive to the amount of pressure or force being exerted.

In still yet other examples, noise may be introduced into the electronic device 100 when the electronic device 100 is charging (e.g., power line noise). Likewise, noise may be introduced into the electronic device 100 by a mechanical vibration such as, for example, when the electronic device 100 plays sounds (e.g., music, notifications, etc.) from one or more speakers or other such output devices. Noise may also be caused when the electronic device 100 is moving or being carried by a user. For example, if a user is running or exercising with the electronic device 100, the running motion of the user may cause the force sensing device to erroneously detect force input.

Noise may also be caused by different manufacturing tolerances or defects. Although specific examples have been given, noise may be introduced into the electronic device 100 by various other means. As such, the embodiments described herein may be used to determine the amount of noise present in the electronic device 100 and dynamically increase force input thresholds accordingly.

Figure 2A:
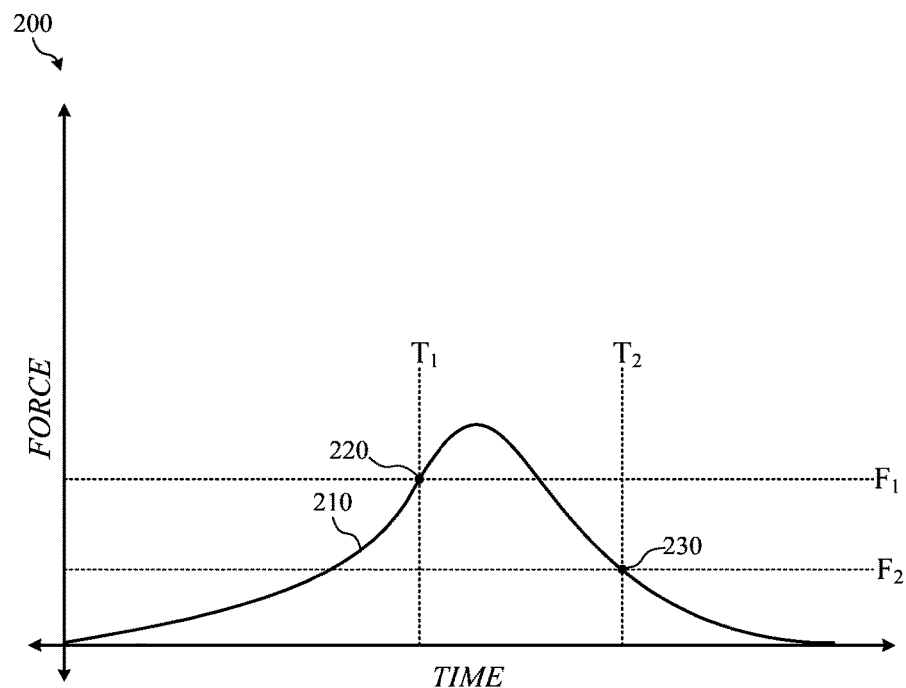
FIG. 2A illustrates a force versus time graph of a force that is registered by a force sensing device having a first force threshold and a second force threshold according to one or more embodiments of the present disclosure.

FIG. 2A illustrates an example force input graph 200 that illustrates an amount of force (shown as line 210) that is received by a force sensing device of an electronic device over a given time period. In this particular example, the force input graph 200 may represent a continuous amount of force that is subsequently translated to a button press. Thus, when the force detected by the force sensing device exceeds a first force threshold (designated by the line labeled $F_1$) at time $T_1$ (point 220), the force sensing device may detect a button press event. Put another way, the state of a button press may change from "unpressed" to "pressed." Likewise, when the detected amount of force crosses a second force threshold (designated by the line labeled $F_2$) at a second time $T_2$ (point 230), the state of the button press may change from "pressed" to "unpressed." As such, a button press and release event may be signaled and the electronic device may perform an associated function.

In the example illustrated in FIG. 2A, the first force threshold $F_1$ may be approximately 200 grams of force while the second force threshold $F_2$ may be approximately 150 grams of force. Thus, the difference between the first force threshold $F_1$ and the second force threshold $F_2$ may be approximately 50 grams of force. Although specific values have been given, these values are not to be taken in a limiting sense.

However, any noise that is present in the electronic device may affect the accuracy of the force sensing device. For example, noise may cause the force sensing device to erroneously determine that the first force threshold $F_1$ is met or exceeded a time before or after point 220. As such, a button press event would be inaccurately triggered. Likewise, the noise may cause the force sensing device to erroneously determine that the second force threshold $F_2$ is crossed at a time before or after point 230 which would inaccurately trigger a button release event.

In order to remedy this, one or more sensors or other such components of the electronic device determine one or more operating conditions of the electronic device. Once the operating conditions of the electronic device have been determined, the first force threshold $F_1$ and the second force threshold $F_2$ are dynamically adjusted.

More specifically, the dynamic adjustment of the first force threshold $F_1$ and the second force threshold $F_2$ provide a hysteresis to the force sensing device with respect to detecting a button press event and a button release event. For example and as discussed above, the input force has to exceed a first force threshold $F_1$ to trigger a button press event and may have to fall below the second force threshold $F_2$ to trigger a button release event. The hysteresis provides a force cushion to help prevent inadvertent button event triggers as a result of the noise.

Figure 2B:
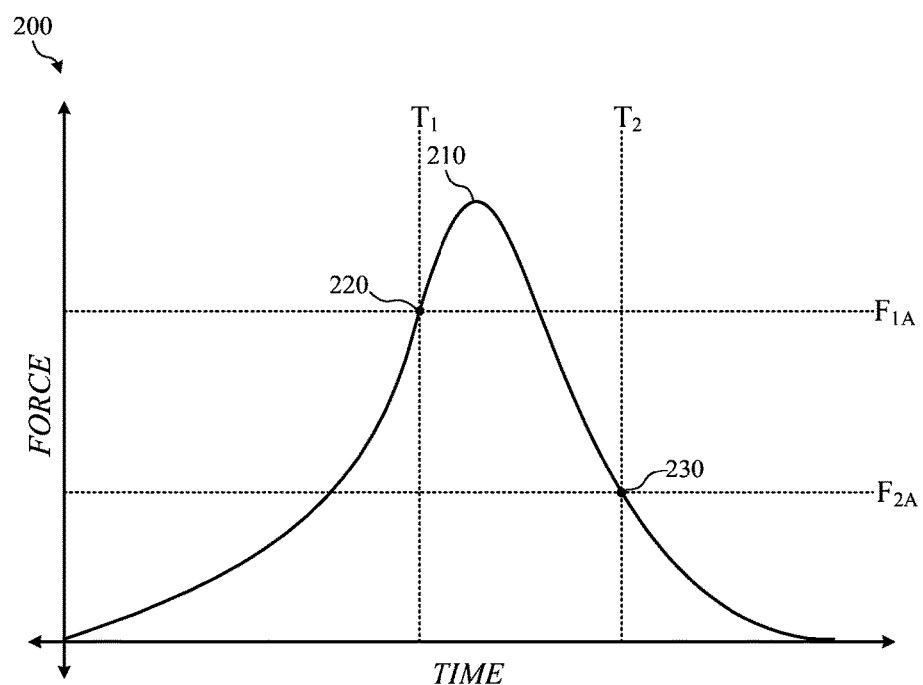
FIG. 2B illustrates a force versus time graph of a force that is registered by a force sensing device having a dynamically updated first force threshold and a dynamically updated second force threshold according to one or more embodiments of the present disclosure.

For example, as shown in FIG. 2B, the first force threshold $F_{1A}$ and the second force threshold $F_{2A}$ are both increased when compared to the force thresholds of FIG. 2A. In one example, the first force threshold $F_{1A}$ may increase to approximately 300 grams of force while the second force threshold $F_{2A}$ may increase to approximately 200 grams of force. Accordingly, the difference between the thresholds is approximately 100 grams of force. Although specific values have been given, these values are used as examples and should not be taken in a limiting sense.

In FIG. 2B, the first force threshold $F_{1A}$ is crossed at $T_1$ (point 220) to trigger a button press event while the second force threshold $F_{2A}$ is crossed at $T_2$ (point 230) to trigger a button release event. It should be noted that a button release event will not be triggered unless and until a button press event is first detected. Thus, if the amount of force that is detected by the force sensing device does not exceed the first force threshold $F_{1A}$ to trigger a button press event, a button release event is not detected when the second force threshold $F_{2A}$ is crossed.

In some embodiments, the electronic device may output a notification to alert a user when one or both force thresholds are crossed. The notifications may be a haptic or tactile notification, an audible notification, a visual notification or a combination thereof.

The adjustments to the force thresholds are based, at least in part, on the detected operating conditions of the electronic device. In some embodiments, the adjustments to the force thresholds may be specific to the type of noise detected. For example, if the detected noise is directed to temperature, the first force threshold $F_1$ and the second force threshold $F_2$ may be adjusted by a fixed amount or otherwise scaled by a determined multiplier. Likewise, if the detected noise is directed to motion or movement of the electronic device, the first force threshold $F_1$ and the second force threshold $F_2$ may be adjusted by a second fixed amount or otherwise scaled by a determined multiplier. In still yet other embodiments, the first force threshold $F_1$ may be adjusted while the second force threshold $F_2$ may stay the same or vice versa. In another implementation, the first force threshold $F_1$ and the second force threshold $F_2$ may be dynamically adjusted by the same amount regardless of the type of noise detected.

In some implementations, the force thresholds may be adjusted based on the location registered by a touch sensor. For example, the force threshold for the forces calculated at each position may be depend on the location of the touch, for example a touch at a corner requiring a higher force threshold for button actuation than a touch near the center of the sensor. The force thresholds may also be adjusted based on one or more configurations registered by a touch sensor. For example, if two or more finger touch locations are registered by the system, the force threshold for the forces calculated at each position may be modified.

In still other implementations, the force thresholds may be adjusted based on one or more applications that are executing on the electronic device. For example, if the electronic device is executing a game application or an exercise application, the force thresholds may increase or decrease accordingly.

The first force threshold $F_1$ and the second force threshold $F_2$ may also be adjusted based on the amount of noise detected. For example, if the amount of noise detected by the one or more sensors is above a first noise threshold, the first force threshold $F_1$ and the second force threshold $F_2$ may be adjusted by a first amount. Likewise, if the amount of noise detected is above a second noise threshold, the first force threshold $F_1$ and the second force threshold $F_2$ may be adjusted by a second amount.

Although the examples described above are directed to determining an increase in the amount of noise that is present in the electronic device and updating the force thresholds accordingly, the force thresholds may also be dynamically adjusted based on external sources or noise that may affect the readings of the force sensing device. The force threshold may also be dynamically adjusted when the amount of noise present in the electronic device decreases. For example, if little to no noise is present in the electronic device, the first force threshold $F_1$ and the second force threshold $F_2$ (and the difference between the thresholds) may decrease or remain unadjusted.

The example force input graphs shown in FIGS. 2A-2B represent continuous force input that is translated into a discrete input such as a button press. However, the continuous force input, and the adjustments to the force input thresholds such as described herein may be used for other types of continuous input that is, optionally, translated into discrete events or trigger discrete events.

Figure 3:
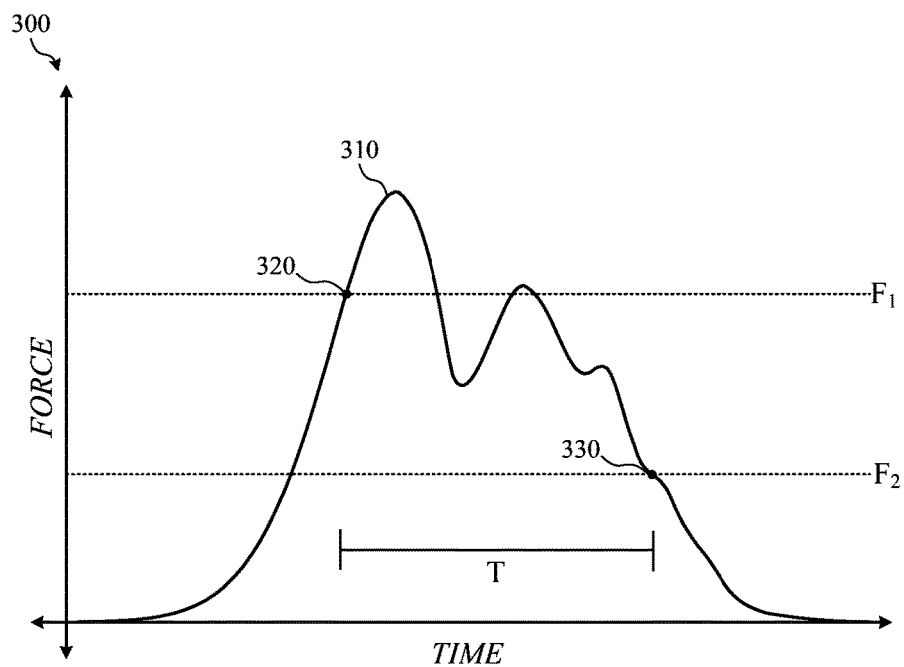
FIG. 3 illustrates a force versus time graph of a force that is registered by a force sensing device for a continuous force input that is translated into a drag and drop discrete event according to one or more embodiments of the present disclosure.

For example, FIG. 3 illustrates a force input graph 300 over a given time period that corresponds to a drag and drop and event. More specifically, the force input graph 300 illustrates continuous force input that may be translated into a drag and drop discrete event. As shown in FIG. 3, once the amount of force (represented by line 310) meets or exceeds the first force threshold $F_1$ at point 320, a button press event (and an optional haptic output) is triggered. The amount of force is monitored to determine whether the force exceeds the second force threshold $F_2$ over a timeframe threshold T to signal the drag and drop event. Thus, if user continues to exert a force over the timeframe threshold, the device knows a drag operation is being performed. As shown in FIG. 3, a subsequent event (such as a second button press event) is not triggered even though the amount of force drops below the first force threshold $F_1$ and subsequently exceeds the first force threshold $F_1$ a second time. Thus, the drag event continues until the received amount of force drops below the second force threshold $F_2$ at point 330 at which time the "drag" terminates and the "drop" is performed. As discussed above, an optional haptic output may be provided when the detected amount of force drops below the second force threshold $F_2$.

The first force threshold $F_1$ and the second force threshold $F_2$ may be adjusted in a similar manner such as described above. That is, the force thresholds may be dynamically adjusted based on one or more detected operating conditions of the electronic device.

Figure 4:
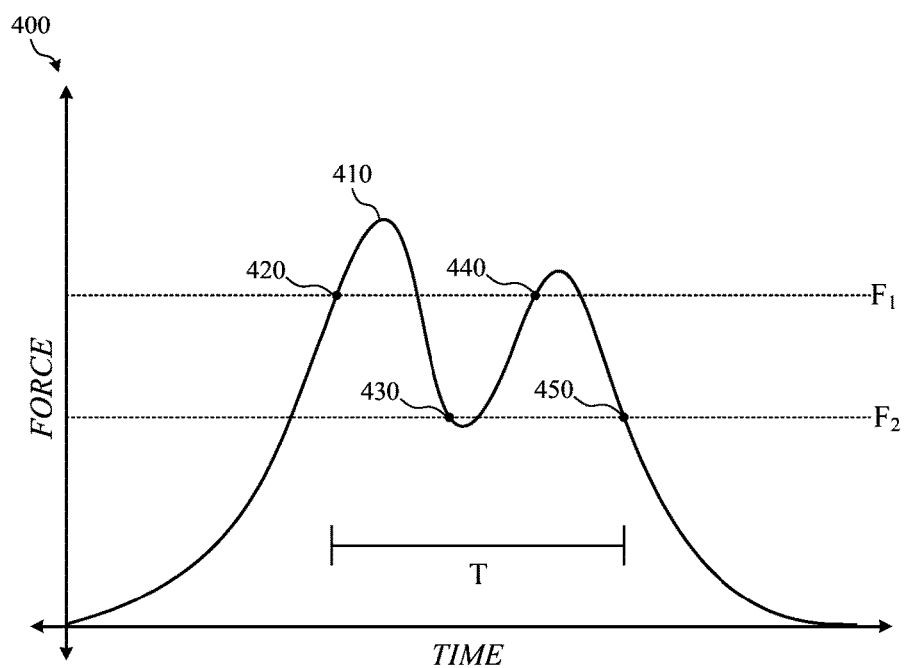
FIG. 4 illustrates a force versus time graph of a force that is registered by a force sensing device for a continuous force input that is translated into a double click discrete event according to one or more embodiments of the present disclosure.

FIG. 4 illustrates a force input graph 400 over a given time period that corresponds to a double click event. More specifically, the force input graph 400 illustrates a continuous force input that may be translated into a double click discrete event. As shown in FIG. 4, once the amount of force (represented by line 410) meets or exceeds the first force threshold $F_1$ at point 420, a button press event is triggered. When the amount of force meets or passes below the second force threshold $F_2$ at point 430 a button release event is detected.

Once the second force threshold $F_2$ has been reached, the amount of force received and detected by the force sensing device may increase a second time within a particular time constraint to indicate the beginning of a second button press event of the double click. That is, the detected or received amount of force passes the first threshold a second time at point 440. Once the first force threshold $F_1$ is met or has been exceeded, a second button release event is detected when the force meets or falls below the second force threshold at point 450.

As indicated above, in some implementations, in order to trigger a double click event, the received force must pass the first threshold $F_1$ and the second force threshold $F_2$ the requisite number of times within a given time constraint. Further, a haptic output may be provided by the electronic device to notify a user that the various thresholds have been crossed.

As with the various force thresholds described above, the first force threshold $F_1$ and the second force threshold $F_2$ of the double click event may be adjusted in a similar manner.

Figure 5:
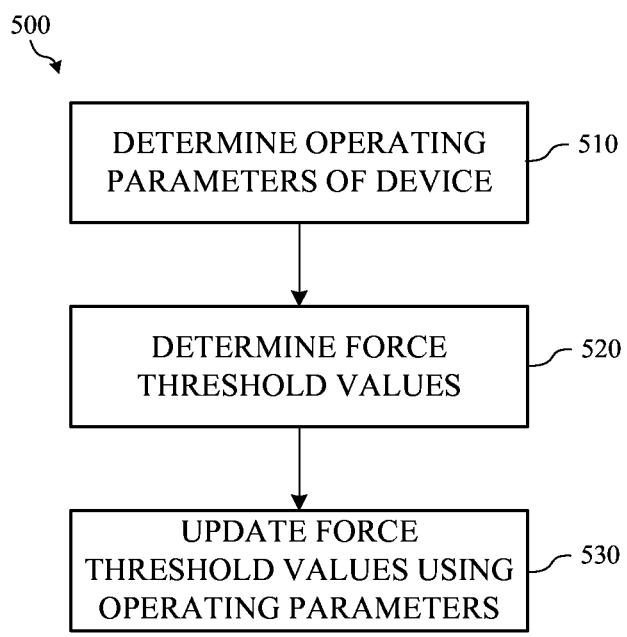
FIG. 5 illustrates a method for updating force thresholds according to one or more embodiments of the present disclosure.

FIG. 5 illustrates a method 500 for updating force thresholds according to one or more embodiments of the present disclosure. The method 500 may be used by an electronic device having a force sensing device such as, for example, electronic device 100 (FIG. 1). More specifically, the method 500 may be used by one or more components of the electronic device and/or firmware of the electronic device to determine operating conditions of the electronic device and adjust force thresholds accordingly.

Method 500 begins at operation 510 in which one or more operating conditions of the electronic device are determined. The operating conditions may be determined by one or more sensors contained in or otherwise associated with the electronic device. For example, a temperature sensor may determine an operating temperature of the electronic device and/or the ambient temperature of the electronic device. An accelerometer may determine whether the electronic device is moving. A force sensor may determine whether or not the electronic device is being held by a user. Although specific examples have been given, the electronic device may include various sensors to determine the operating conditions of the electronic device as well as determining the amount of noise that is introduced into the electronic device based on the operating conditions.

In another implementation, a processor or processing unit of the electronic device may also be able to determine one or more operating conditions of the electronic device. For example, the processing unit may determine one or more applications that are executing on the electronic device and dynamically adjust the force thresholds accordingly. In another implementation, the processing unit may determine an operating state of the electronic device, such as, for example, whether the electronic device is in a charging state, in a sleep state and so on.

When the operating conditions of the electronic device have been determined, flow proceeds to operation 520 and the current force threshold values are determined. Once the current force threshold values are determined, flow proceeds to operation 530 and the force threshold values are updated using the determined operating conditions.

As discussed above, the force threshold values may be dynamically updated based on the determined operating conditions. That is, the force thresholds values may change by a first amount based on a first operating condition and may change by a second amount based on second operating condition.

In another embodiment, the force threshold values may be dynamically updated based on a detected or determined amount of noise. For example, if the detected noise exceeds a first threshold, the first and/or the second force threshold values may be dynamically updated by a first amount. If the detected noise exceeds a second threshold, the first and/or the second force threshold values may be dynamically updated by a second amount.

Figure 6:
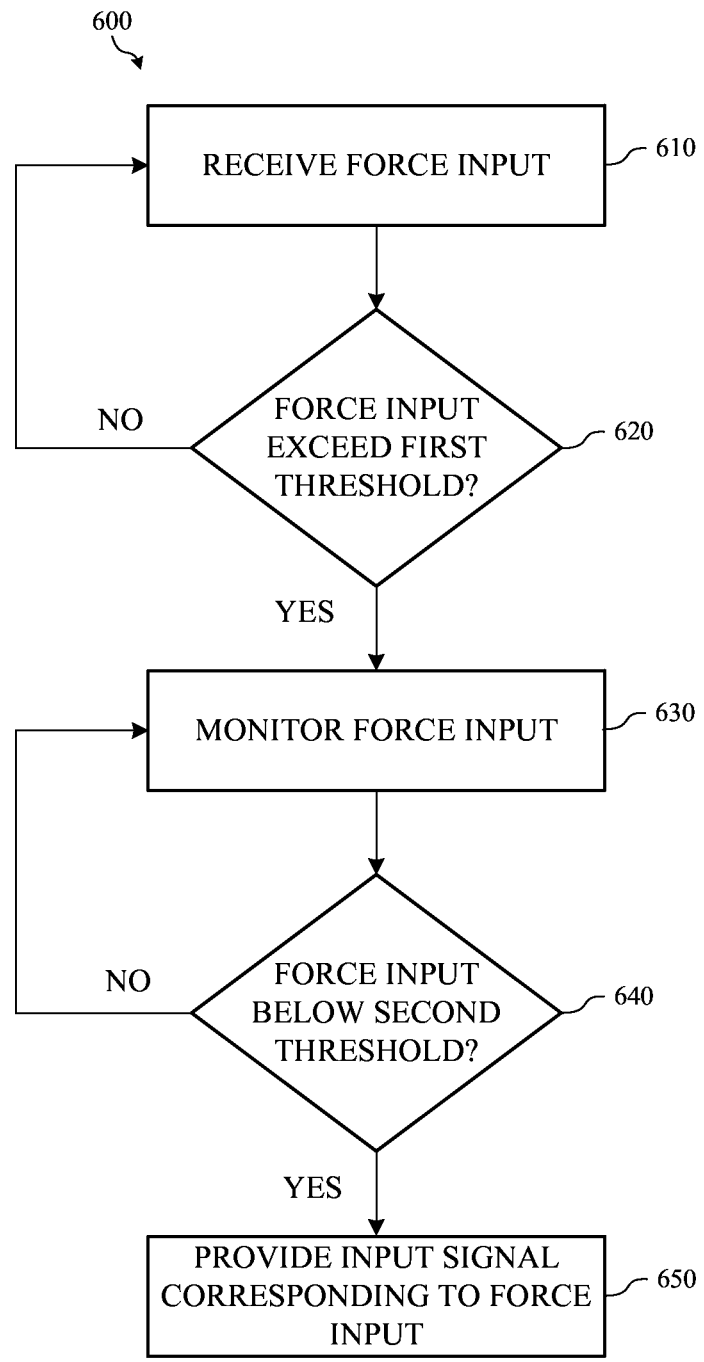
FIG. 6 illustrates a method for using a force sensing device to determine a type of received input according to one or more embodiments of the present disclosure.

FIG. 6 illustrates a method 600 for using a force sensing device to determine a type of received input according to one or more embodiments of the present disclosure. In some implementations, the method 600 may be used by the electronic device 100 shown and described above. More specifically, the method 600 may be used to translate a continuous force input that is received on a surface of the electronic device to a discrete event.

Method 600 begins at operation 610 when a first force input is received. The force input may be received by a user touching or otherwise actuating a surface, a button, a display, or a portion of the display of an electronic device. In another implementation, the force input may be provided by a stylus or other actuation mechanism.

Flow then proceeds to operation 620 and a determination is made as to whether the received force input exceeds a first force threshold. If the received force input does not exceed a first force threshold, flow returns back to operation 610. If the received force input exceeds the first force threshold, flow proceeds to operation 630 and the force input is monitored.

More specifically, the received force input is monitored to determine the type of continuous input that is received. For example, the received force input may be monitored over a time period to determine whether the continuous force input is to be translated into a button press, a double click, a drag and drop event and so on.

Operation 630 also monitors the force input to determine 640 whether or when the received force input falls below a second force threshold. If the detected amount of force does not fall below the second force threshold, the amount of force may be continuously monitored. When the force falls below the second force threshold, flow proceeds to operation 650 and an input is provided that corresponds to the determined force input. More specifically, operation 650 enables the electronic device to determine the type of discrete event to process based on type and/or duration of the received continuous force input.

In some implementations, method 600 may be used in conjunction with or otherwise be associated with method 500. That is, method 500 may be used to dynamically adjust the various force input thresholds that are monitored in method 600.

Figure 7:
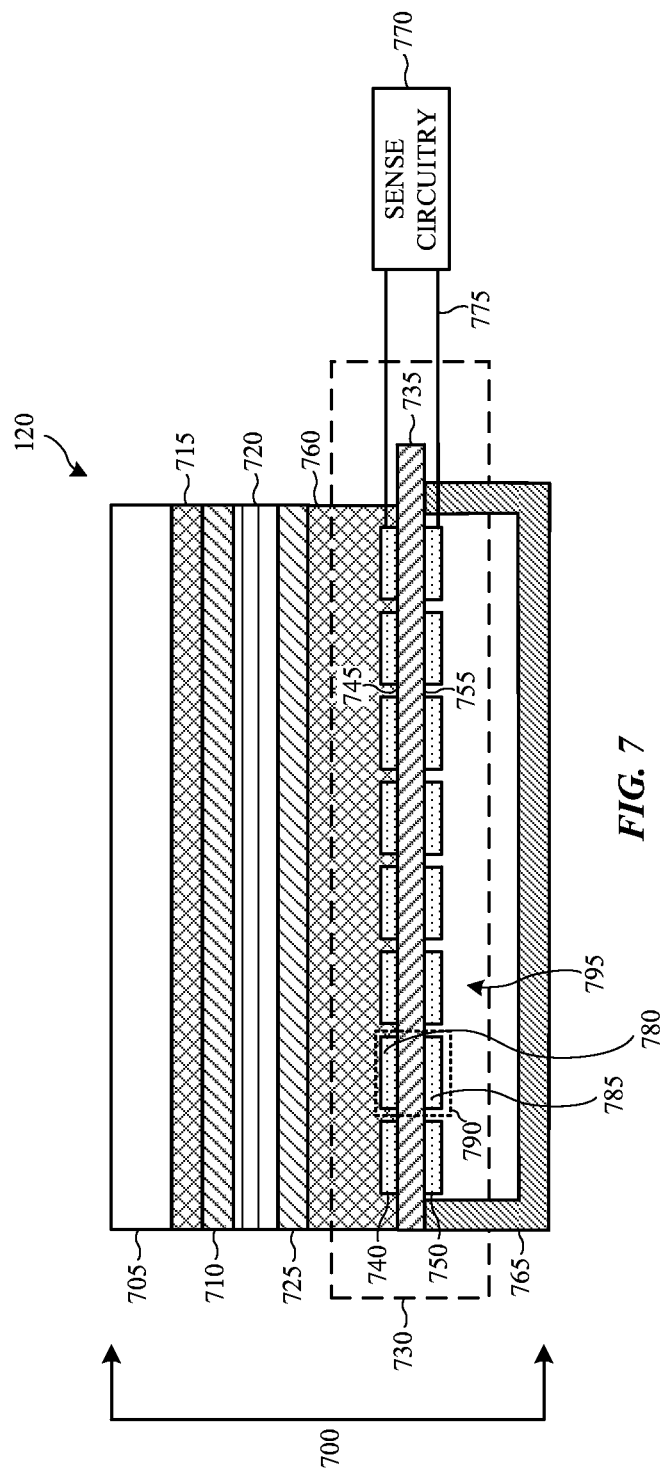
FIG. 7 illustrates a cross-section of a display of an example electronic device according to one or more embodiments of the present disclosure.

FIG. 7 depicts a cross-section view of the display 120 (FIG. 1). The cross-section view illustrates a display stack 700 for the display 120. A cover glass 705 is positioned over a front polarizer 710. The cover glass 705 can be a flexible touchable surface that is made of any suitable material, such as, for example, a glass, a plastic, sapphire, or combinations thereof. The cover glass 705 can act as an input region for a touch sensing device and a force sensing device by receiving touch and force inputs from a user. The user can touch the cover glass 705 with one or more fingers or with another element such as a stylus.

An adhesive layer 715 can be disposed between the cover glass 705 and the front polarizer 710. Any suitable adhesive can be used in adhesive layer 715. In one example, the adhesive layer 715 is an optically clear adhesive. A display layer 720 can be positioned below the front polarizer 710. As described previously, the display layer 720 may take a variety of forms, including a liquid crystal display (LCD), a light-emitting diode (LED) display, and an organic light-emitting diode (OLED) display. In some embodiments, the display layer 720 can be formed from glass or have a glass substrate. Embodiments described herein include a multi-touch touchscreen LCD display layer.

Additionally, the display layer 720 can include one or more layers. For example, a display layer 720 can include a VCOM buffer layer, a LCD display layer, and a conductive layer disposed over and/or under the display layer. In one embodiment, the conductive layer may comprise an indium tin oxide (ITO) layer.

A rear polarizer 725 may be positioned below the display layer 720, and a strain-sensitive structure 730 below the rear polarizer 725. The strain-sensitive structure 730 includes a substrate 735 having a first set of independent strain-sensitive films 740 on a first surface 745 of the substrate 735 and a second set of independent strain-sensitive films 750 on a second surface 755 of the substrate 735. In the illustrated embodiment, the first and second surfaces 745, 755 are opposing top and bottom surfaces of the substrate 735, respectively. An adhesive layer 760 may attach the substrate 735 to the rear polarizer 725.

The strain-sensitive films may be formed as an array of rectilinear strain sensing elements. Each strain-sensitive film in the first set of independent strain-sensitive films 740 is aligned vertically with a respective one of the strain-sensitive films in the second set of independent strain-sensitive films 750. In many embodiments, each individual strain-sensitive film may take a selected shape. For example, in certain embodiments, the strain-sensitive film may be deposited in a serpentine pattern although other patterns may be used.

A back light 765 can be disposed below the strain sensitive structure 730. The back light 765 may be configured to support one or more portions of the substrate 735 that do not include strain-sensitive films. For example, the back light 765 can support the ends of the substrate 735. Other embodiments may configure a back light 765 differently.

The strain-sensitive films are typically connected to sense circuitry 770 through conductive connectors 775. The sense circuitry 770 is configured to detect changes in an electrical property of each of the strain-sensitive films. In this example, the sense circuitry 770 may be configured to detect changes in the resistance of the strain-sensitive films 740, 750, which can be used to estimate a force that is applied to the cover glass 705. In some embodiments, the sense circuitry 770 may also be configured to provide information about the location of a touch based on the relative difference in the change of resistance of the strain-sensitive films 740, 750.

For example, the strain sensitive films 740, 750 can be configured as strain gauges that are formed with a piezoresistive material. When a force is applied to an input region (e.g., the cover glass 705), the strain sensitive structure 730 is strained and the resistance of the piezoresistive material changes in proportion to the strain. The force can cause the strain sensitive structure 730 to bend slightly. As a result, the bottom of the strain sensitive structure elongates while the top compresses. The strain gauges measure the elongation or compression of the surface, and these measurements can be correlated to the amount of force applied to the input region.

Two vertically aligned strain-sensitive films (e.g., 780 and 785) form a strain sensing element 790. The sense circuitry 770 may be adapted to determine a difference in an electrical property of each strain sensing element. For example, a force may be received at the cover glass 705, which in turn causes the strain sensitive structure 730 to bend. The sense circuitry 770 is configured to detect changes in an electrical property (e.g., resistance) of the one or more strain sensing elements, and these changes are correlated to the amount of force applied to the cover glass 705.

In the illustrated embodiment, a gap 795 exists between the strain sensitive structure 730 and the back light 765. Strain measurements intrinsically measure elongation or compression due to bending of the surface which is in turn due to the difference between forces on the top surface of the substrate 735 and forces on the bottom surface of the substrate 735. When the gap 795 is present, there is no force on the bottom surface. Thus, the force on the top surface can be measured independently of the force on the bottom surface. In alternative embodiments, the strain sensitive structure 730 may be positioned above the display layer when the display stack 700 does not include the gap 795.

Figure 8:
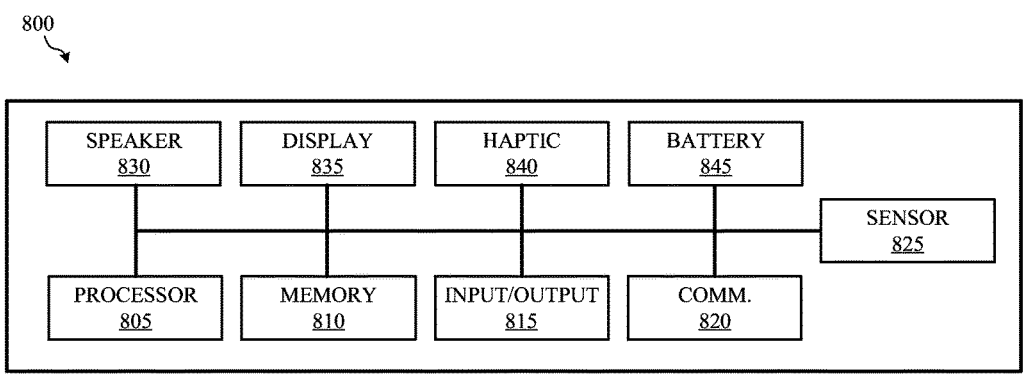
FIG. 8 illustrates example components of an electronic device according to one or more embodiments of the present disclosure.

FIG. 8 depicts various components and modules that may be present in an example electronic device 800, such as, for example, electronic device 100 of FIG. 1. As shown in FIG. 8, the electronic device 800 includes at least one processor 805 or processing unit configured to access a memory 810. In certain embodiments, the memory 810 may have various instructions, computer programs, force thresholds or other data stored thereon. The instructions or computer programs may be configured to perform one or more of the operations or functions described with respect to the electronic device 800. For example, the instructions may be configured to control or coordinate the operation of the display 835, one or more input/output components 815, one or more communication channels 820, one or more sensors 825, a speaker 830, and/or one or more haptic actuators 840.

The processor 805 may be implemented as any electronic device capable of processing, receiving, or transmitting data or instructions. For example, the processor 805 can be a microprocessor, a central processing unit (CPU), an application-specific integrated circuit (ASIC), a digital signal processor (DSP), or combinations of such devices.

The memory 810 can store electronic data that can be used by the electronic device 800. For example, the memory 810 can store electrical data or content such as, for example, audio and video files, documents and applications, device settings and user preferences, timing and control signals or data for the various modules, data structures or databases, and so on. The memory 810 may also store instructions for determining one or more operating conditions of the electronic device 800 as well as the various force thresholds, noise thresholds and the like. The memory 810 may be any type of memory such as, for example, random access memory, read-only memory, Flash memory, removable memory, or other types of storage elements, or combinations of such devices.

As briefly discussed above, the electronic device 800 may include various input and output components represented in FIG. 8 as Input/Output 815. Although the input and output components are represented as a single item, the electronic device 800 may include a number of different input components, including buttons, input surfaces, microphones, switches, and dials for accepting user input. In some embodiments, the input and output components may include one or more touch sensor and/or force sensors. For example, the display 835 may be comprised of a display stack that includes one or more touch sensors and/or one or more force sensors that enable a user to provide input to the electronic device 800.

The electronic device 800 may also include one or more communication channels 820. These communication channels 820 may include one or more wireless interfaces that provide communications between the processor 805 and an external device or other electronic device. In general, the one or more communication channels 820 may be configured to transmit and receive data and/or signals that may be interpreted by instructions executed on the processor 805. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

The electronic device 800 may also include one or more sensors 825. Although a single representation of a sensor 825 is shown in FIG. 8, the electronic device 800 may have many sensors. These sensors may include strains sensors, piezoelectric sensors, biometric sensors, temperature sensors, accelerometers, barometric sensors, moisture sensors and so on. Some sensors 825 may combine functions. For example, the strain sensor may also be a pixelated temperatures sensor.

One or more one or more acoustic modules or speakers 830 may also be included in the electronic device 800. The speaker 830 may be configured to produce an audible sound or an acoustic signal. The speaker 830 may be used to provide an audible sound that is associated with a particular type of haptic output to inform the user when one or more force thresholds have been crossed.

As also shown in FIG. 8, the electronic device 800 may include one or more haptic actuators 840. The haptic actuators 840 may be any type of haptic actuator including rotational haptic devices, linear haptic actuators, piezoelectric devices, vibration elements, and so on. The haptic actuator 840 is configured to provide punctuated and distinct feedback to a user of the electronic device 800.

In certain embodiments, the electronic device 800 may include an internal battery 845. The internal battery 845 may be used to store and provide power to the various components and modules of the electronic device 800 including the haptic actuator 840. The internal battery 845 may be configured to be charged using a wireless charging system although a wired charging system may also be used.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for translating a continuous force input on an electronic device into a discrete event, the method comprising:
    establishing a first force threshold and a second force threshold for an input force sensor;
    determining one or more operating conditions of the electronic device using a sensor difference from the input force sensor, the one or more operating conditions comprising at least one of an operating temperature of the electronic device, an ambient temperature, a mechanical vibration, an amount of sound, an application that is executing on the electronic device, a charging state of the electronic device, presence of moisture, presence of a contaminant, heat produced by a component of the electronic device, power line noise, a manufacturing a tolerance, or a manufacturing defect;
    dynamically increasing a difference between the first force threshold and the second force threshold by updating at least one of the first force threshold or the second force threshold based, at least in part, on the one or more operating conditions of the electronic device;
    measuring the continuous force input on the electronic device using the input force sensor, after dynamically increasing the difference between the first force threshold and the second force threshold; and
    triggering the discrete event when the continuous force input measured by the input force sensor exceeds the first force threshold and subsequently falls below the second force threshold.

2. The method of claim 1, wherein the one or more operating conditions comprise the operating temperature of the electronic device, the ambient temperature of the electronic device, or the heat produced by the component of the electronic device.

3. The method of claim 1, wherein the one or more operating conditions comprise the amount of sound.

4. The method of claim 1, wherein the one or more operating conditions comprise the mechanical vibration.

5. The method of claim 1, wherein the one or more operating conditions comprise the amount of sound wherein the sound is being played back by the electronic device.

6. The method of claim 1, further comprising:
    subsequent to triggering the discrete event, dynamically decreasing the difference between the first force threshold and the second force threshold.

7. A method comprising for determining a type of force input detected on a surface of an electronic device by a force sensing device, the method comprising:
    determining a first force input threshold and second force input threshold based, at least in part, on an operating condition of the electronic device determined by a sensor different from the force sensing device, the operating condition of the electronic device comprising at least one of an operating temperature of the electronic device, an ambient temperature, a mechanical vibration, an amount of sound, an application that is executing on the electronic device, a charging state of the electronic device, presence of moisture, presence of a contaminant, heat produced by a component of the electronic device, power line noise, movement of the electronic device, a manufacturing tolerance, or a manufacturing defect;
    receiving a continuous force input on the surface;
    determining, using a force sensing device, a first time at which the continuous force input exceeds the first force input threshold;
    further determining, using the force sensing device, a second time at which the continuous force input falls below the second force input threshold, the second force threshold being less than the first force input threshold;
    providing, by the force sensing device, a first input signal indicative of a discrete event that is associated with the continuous force input at the second time.

8. The method of claim 7, wherein the operating condition of the electronic device is the operating temperature of the electronic device, an ambient temperature, or the heat produced by a component of the electronic device.

9. The method of claim 7, further comprising:
determining a timeframe between the first time and the second time; and
providing a second input signal indicative of the type of force input received when the timeframe exceeds a timeframe threshold.

10. The method of claim 7, wherein the operating condition of the electric device is the mechanical vibration.

11. An electronic device comprising:
a force sensing device;
a second sensor different from the force sensing device;
a processing unit; and
a memory coupled to the processing unit, the memory configured to store instructions which, when executed by the processing unit, cause the processing unit to:
determine a type of force input received on a surface of the electronic device by:
determine a first force threshold and a second force threshold that correspond to the type of force input;
determine, using data obtained by the second sensor, one or more operating conditions of the electronic device, the one or more operating conditions comprising at least one of an operating temperature of the electronic device, an ambient temperature, an amount of sound, an application that is executing on the electronic device, a charging state of the electronic device, presence of moisture, presence of a contaminant, heat produced by a component of the electronic device, power line noise, a manufacturing tolerance, or a manufacturing defect;
dynamically update at least one of the first force threshold or the second force threshold based, at least in part, on the one or more operating conditions of the electronic device;
determine a discrete event based on whether the force input received on the surface of the electronic device, as measured by the force sensing device, exceeds the first force threshold and subsequently falls below the second force threshold.

12. The electronic device of claim 11, wherein the force sensing device comprises a strain sensor.

13. The electronic device of claim 11, wherein the force sensing device comprises a capacitive sensor.

14. The electronic device of claim 11, wherein the force sensing device is associated with a display stack of the electronic device.

15. The electronic device of claim 11, wherein force sensing device is associated with a mechanical input device.

16. The electronic device of claim 11, wherein the one or more operating conditions comprise an application that is executing on the electronic device.

17. The electronic device of claim 11, wherein the one or more operating conditions comprise a charging state of the electronic device.

18. The electronic device of claim 11, wherein the memory further stores instructions for providing a haptic output on the electronic device when it is determined that a received force input falls below the dynamically updated second force threshold.

19. The electronic device of claim 11, wherein the one or more operating conditions comprise the mechanical vibration.

20. The method of claim 11, wherein the one or more operating conditions comprise the operating temperature of the electronic device, the ambient temperature of the electronic device, or the heat produced by the component of the electronic device.

21. A method for translating a continuous force input on an electronic device into a discrete event, the method comprising:
establishing a first force threshold and a second force threshold for an input force sensor;
detecting a mechanical vibration of the electronic device using a sensor different from the input force sensor;
dynamically increasing a difference between the first force threshold and the second force threshold, in response to the detected mechanical vibration of the electronic device, by updating at least one of the first force threshold and the second force threshold;
measuring the continuous force input on the electronic device using the input force sensor, after dynamically increasing the difference between the first force threshold and the second force threshold; and
triggering the discrete event when the continuous force input measured by the input force sensor exceeds the first threshold and subsequently falls below the second threshold.

22. The method of claim 21, further comprising:
determining the continuous force input measured by the input force sensor falls below the first threshold and subsequently exceeds the first threshold at least one additional time before falling below the second threshold; and
interpreting a timeframe threshold between a first time the continuous force input exceeds the first threshold and a subsequent time when the continuous first threshold falls below the second threshold as a drag and drop event.

* * * * *